US005742611A

United States Patent [19]

Brandin

[11] Patent Number: 5,742,611
[45] Date of Patent: Apr. 21, 1998

[54] CLIENT SERVER NETWORK AND METHOD OF OPERATION

[75] Inventor: Christopher Lockton Brandin, Colorado Springs, Colo.

[73] Assignee: NEO-Core, LLC

[21] Appl. No.: 617,135

[22] Filed: Mar. 18, 1996

[51] Int. Cl.⁶ ............................................. G06F 17/30
[52] U.S. Cl. ............................................. 370/473; 395/800
[58] Field of Search .................... 395/601, 609, 395/610, 611, 612, 613, 614, 615, 800, 200.01; 370/392, 473

[56] References Cited

U.S. PATENT DOCUMENTS

| | | | |
|---|---|---|---|
| 4,527,239 | 7/1985 | Brandin | 364/300 |
| 4,945,475 | 7/1990 | Bruffey et al. | 364/200 |
| 5,237,678 | 8/1993 | Kuechler et al. | 395/600 |
| 5,341,483 | 8/1994 | Frank et al. | 395/600 |
| 5,341,499 | 8/1994 | Doraph | 395/200.01 |
| 5,388,257 | 2/1995 | Bauer | 395/600 |
| 5,418,947 | 5/1995 | Hsu et al. | 395/600 |
| 5,446,736 | 8/1995 | Gleeson et al. | 370/473 |
| 5,524,253 | 6/1996 | Pham et al. | 395/800 |
| 5,563,878 | 10/1996 | Blakeley et al. | 370/392 |

Primary Examiner—Thomas G. Black
Assistant Examiner—Ruay Lian Ho
Attorney, Agent, or Firm—Dale B. Halling

[57] ABSTRACT

A client server network (10) has a number of clients (12, 14, 16), each having a client transform generator (18, 20, 22). The clients (12, 14, 16) transmit a number of messages each of which contains an address (38, 54) and a confirmer (40, 56). The clients (12, 14, 16) are all connected to a communication network (24, 26) that carries the messages. A server (28) has a server transform generator (44) and is coupled to the communication network (24, 26). The server (28) receives the messages containing the address (38, 54) and the confirmer (40, 56).

22 Claims, 3 Drawing Sheets

CLIENT SERVER NETWORK AND METHOD OF OPERATION

FIELD OF THE INVENTION

The present invention relates generally to the computers and more particularly to a client server network and method of operation.

BACKGROUND OF THE INVENTION

Client server networks for computers have become very common. The server is used as a central repository for information that is then available to all the clients on the network. The bottlenecks in using such an architecture include the limited transmission bandwidth of the local area network or wide area network that connects the plurality of clients to the server. The second bottleneck is the limited access speed of the server when presented with a request for information it has stored. The majority of traffic on any network are simple queries as opposed to write or read instructions. For instance, in a bank's client server network an automatic teller machine (client) will commonly ask the server is XXX-John Doe's account number or verify that John Doe's account number is XXX. The client has to send both the account number and person's name in order for the server to determine the answer to this query. Once the server receives the information it has to determine the address where the information related to John Doe's account is stored, retrieve the information and make a comparison. The server then sends a reply that may also contain the account number, person's name and the answer. This process involves sending information that is duplicated at both the client and server. As a result, the network is largely carrying information that is duplicated at both the client and the server.

One solution that has been used to cut down on overhead traffic is to limit the length of the key (filename) that tells the server where the information is stored. This results in the users of the network having to remember arcane key names (filenames). For instance, if the account information is stored under the persons name the key might be "JSDoe" (John Smith Doe). While limiting the key lengths reduces traffic somewhat on the network it does nothing to speed up the access at the server to the information.

Thus there exists a need for client server network that does not waste network bandwidth by sending repeated information and speeds the server's access to the information.

SUMMARY OF THE INVENTION

A client server network that overcomes these problems has a number of clients, each having a client transform generator. The clients transmit a number of messages each of which containing an address and a confirmer. The clients are all connected to a communication network that carries the messages. A server has a server transform generator and is coupled to the communication network. The server receives the messages containing the address and the confirmer.

DETAILED DESCRIPTION OF THE DRAWINGS

Figure 1:
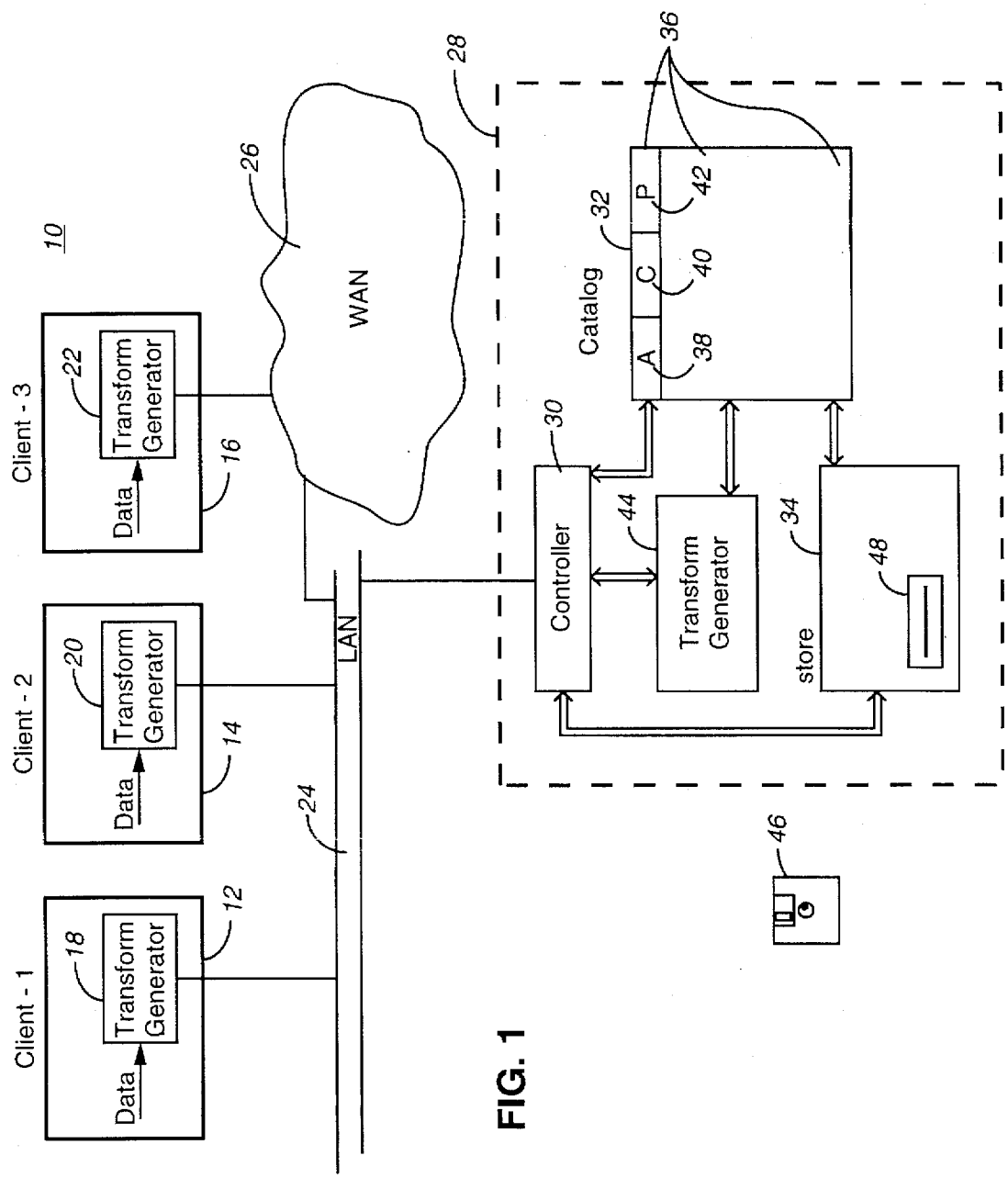
FIG. 1 is a block diagram of a client server network.

FIG. 1 is a block diagram of a client server network 10. The network 10 has a plurality of clients 12-16. Typically, the clients are office or personal computers, but they can also be computer terminals. In other embodiments the clients are a wide variety of other network devices such as automatic teller machines, printers, fax machines and industrial terminals. Each of the clients 12-16 has a transform generator (client transform generator) 18-22 to take full advantage of the invention. The transform generator 18-22 is described in more detail in U.S. patent application Ser. No. 08/613,037 filed on Mar. 8, 1996 by the same Inventor. In other embodiments not every client would have a transform generator. The clients 12-16 are connected to a communication network 24, 26. The communication network can be a local area network 24 or a wide area network 26. The local area network 24 can be ethernet, token ring or any other protocol. The local area network can use coaxial cable, twisted pair, fiber optic cable or wireless. Similarly, the wide area network is not limited to any particular protocol or transmission medium. A server 28 is also connected to the communication network 24, 26. The server 28 has a controller that receives a plurality of messages from the clients 12-16. On the basis of these messages the controller 30 might access a catalog 32 and using the information from the catalog 32 can access other information in a store 34. The catalog 32 has a plurality of addresses 36 and each of the addresses 36 is capable of containing an association 38, a confirmer 40 and a link pointer address list (linked pointer list) 42. The server 28 also includes a transform generator (server transform generator) 44. One reason for having the transform generator 44 at the server 28 is in case one of the clients does not have a transform generator. Another reason for the server transform generator 44 is to be able to perform manipulations of the addresses and the confirmers (i.e., transforms). These manipulations include combining transforms, combine multiple transforms and removing individual transforms from combined transforms.

The controller 30 can be a standard microprocessor or could be a hardware circuit specifically designed for this function. The transform generator 18-22, 44 can be implemented in software, firmware or as a specially designed digital circuit. The catalog 32 can be implemented in a random access memory or any other memory chip or system. The store 34 is not required for every embodiment of the invention and can be implemented using a computer mass storage system. In one embodiment the clients are computers, the server is a computer and the functions necessary to operate a client server network according to the invention is accomplished by a software package installed on the network. This embodiment requires that a computer readable storage medium 46 (e.g., diskette, ROM, RAM, hard drive) containing computer readable instruction be installed (e.g., disk drive 48) on the network.

Figure 2:
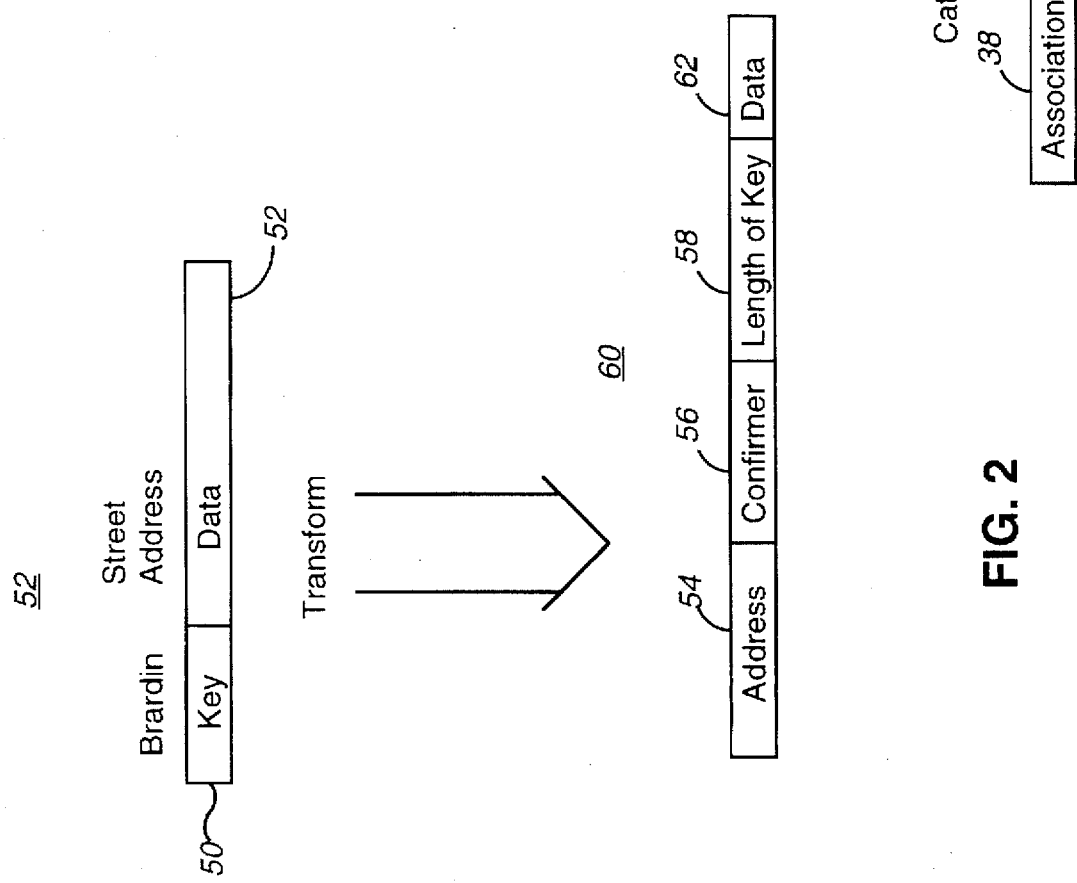
FIG. 2 is a schematic diagram of the process of converting a key to an address and a confirmer.

The transform generators 18-22 converts a key 50 of a block of data 52 (See FIG. 2) to an address 54, a confirmer 56 and in one embodiment a key length 58. For example the client determines that the key 50 is the person's name (e.g., Brandin) and converts the name to a unique address and confirmer. The client then sends a message 60 containing the address 54, the confirmer 56 and the street address (data) 62 to the server 28. The controller 30 at the server 28 accesses the calculated address 54 at the catalog 32 and determines if the address 36 is empty. When the address 36 is empty the controller 30 determines which of a plurality of blocks in the store 34 to store the data associated with the key. The location of the block where the data is stored (written) is an association 38. The association 38 and the confirmer 56 are written to the address 36 of the catalog 32. When the address 36 is not empty, the controller 30 assigns a new address (link pointer) 36 for the information. The new address or link pointer 36 is stored in the link pointer list 42 of the calculated address 54.

One of the properties of the transform generator 18–22, 44 is that it can handle a key of any length (indeterminate length). As a result the keys do no have to have arcane hard to remember names. Another property of the transform generator 18–22, 44 is that it converts all keys to an address and confirmer having a fixed defined length (determinant length). As a result the network traffic is reduced, as most descriptive keys are longer than necessary to uniquely define an item. In addition, by sending the address and the confirm the server eliminates the search process of trying to determine where a plurality of information associated with the key is stored. In a typical server the controller has a complex search routine that identifies where the key is stored in the catalog. The transform generator allows the controller to go directly to the correct address in the catalog in most cases and only requires interrogating a second address in a minority of cases. This significantly speeds up the process of the server finding the required information.

The client server network 10 performs the simple query of whether a user had a certain account number by converting the user's name (key) to an address and a confirmer at the client transform generator. The client then sends a message including the address (calculated address), confirmer and the account number to the server. The controller accesses the address in the catalog and compares the confirmer to an address confirmer (the confirmer stored at the address in the catalog). When they match the controller accesses the block of the store 24 indicated by the association 38 at the address. The block contains a plurality of information connected to the key including in this example the user's account number. The controller compares the stored account number to the transmitted account and if they match the sends a message back to the client indicating a match. When the confirmer and the address confirmer do not match the controller 30 determines if the link pointer list 42 contains a link pointer. When the link pointer list is empty the controller responds with a not found message. When the link pointer list is not empty, the controller finds a link pointer address confirmer at the link pointer address and compares this to the confirmer. When there is a match the controller searches the store at the association indicated by the link pointer address.

In another example the client knows the user's name and needs to access the user's account balance. In this case the user's account balance is stored under a key of the user's name and account number (e.g., JOHNDOE534678800). The client converts the key (user's name) to an address and a confirmer. Using this information the server finds the user's account number (associated key). The server's transform generator can determine the second address and second confirmer for the new key of the user's name and account number (e.g., JOHNDOE534678800). In one embodiment the server's transform generator uses the old key's key length (e.g., number of bits in user's name) to determine the second address and second confirmer. The server responds to the client by sending a second address and second confirmer. This saves the client from having to calculate a new transform (i.e., address and confirmer) to determine the account balance.

Figure 3:
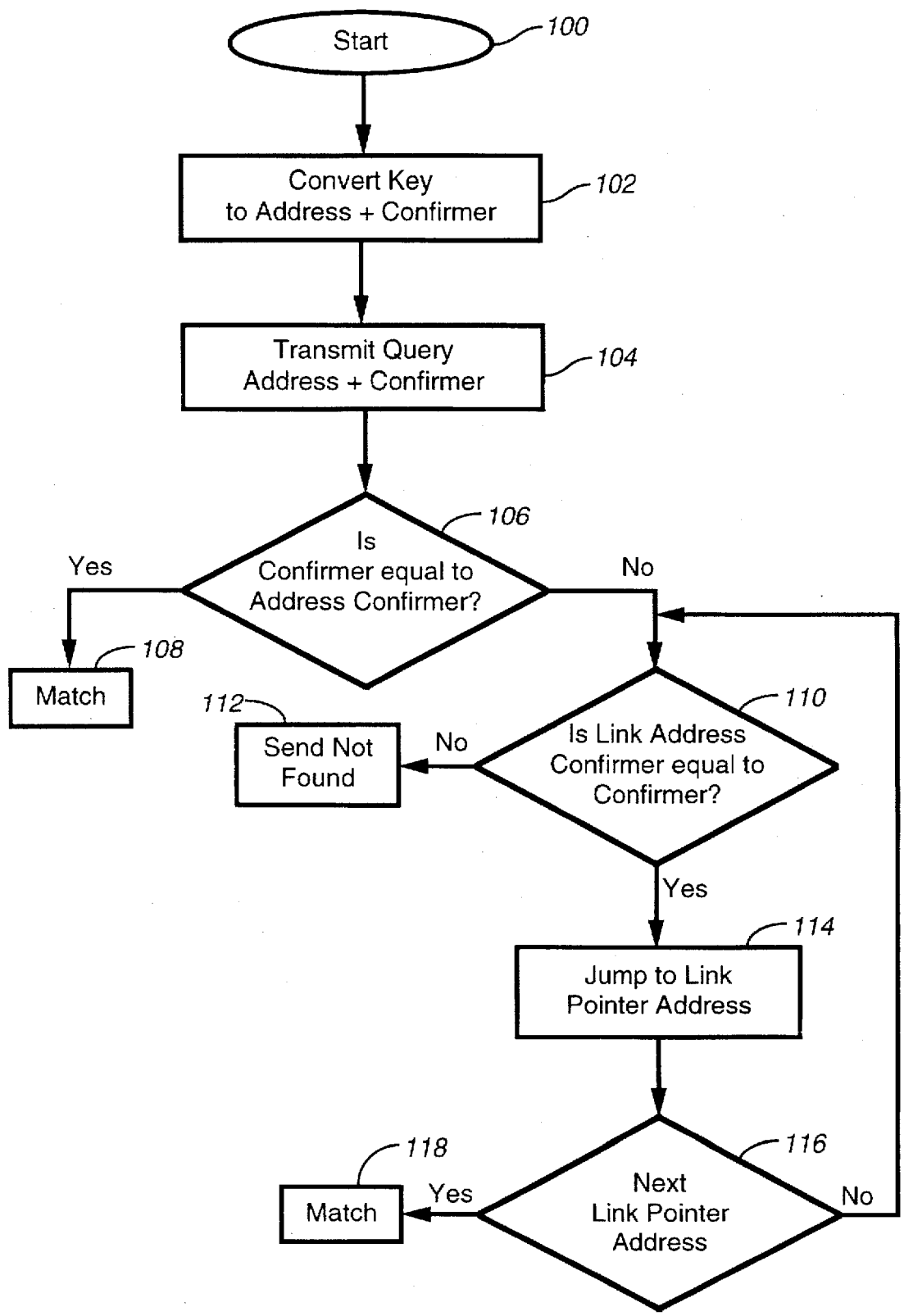
FIG. 3 is a flow chart of a method of operating a client server network.

FIG. 3 is a flow chart of a method of operating a client server network. The process starts, step 100, by converting a key to an address and a confirmer at step 102. Next, a query plus the address and confirmer are transmitted, at step 104. The confirmer is compared to the address confirmer at step 106. When the confirmer is equal to the address confirmer determining a match has occurred at step 108. Once it is determined a match has occurred data related to the key can be found in the store. In other examples the only relevant information will be that there is a match and this information can be sent to the client.

When the confirmer is not equal to the address confirmer at step 106, determining if a link point address exists at step 110. When the link pointer address does not exists, sending a not found message at step 112. When the link pointer address does exists, jumping to a link pointer address (first link pointer address) at step 114. At step 116 the link address confirmer is compared to the confirmer. When the link address confirmer is equal to the confirmer determining a match has occurred at step 118. When the link address confirmer (first link address confirmer) is not equal to the confirmer at step 116, returning to step 110. The process of FIG. 3 describes the basic functions that allow the client server network to speed up the flow of information across the network. By having the clients convert the keys to addresses and confirmers, the processing load of transforming the keys is spread across all the clients instead of centralized at the server. In addition, by sending the address and confirmer to the server, the server can immediately determine which address in the catalog to search. In a standard client server network the server has to search the address of the catalog using, for instances an alphabetical search routine. This usually requires the server to search multiple addresses. Finally, sending the address and confirmer is generally fewer bits than sending a key (e.g., wordprocessor/documents/legal/1995/brandin-report), thus reducing the demand on the networks bandwidth.

Thus there has been described a client server network and method of operation that reduces network traffic and speeds up the server's access to the requested information. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A client server network, comprising:
    a plurality of clients, transmitting a plurality of messages each containing an address and a confirmer, each of the plurality of clients having a client transform generator for generating the address and the confirmer;
    a communication network coupled to each of the plurality of clients for carrying the plurality of messages; and
    a server having a server transform generator and coupled to the communication network and receiving the plurality of messages containing the address and the confirmer.

2. The client server network of claim 1, wherein the server comprises:
    a controller coupled to the communication network and the client transform generator; and
    a catalog coupled to the controller and converting the address to an association.

3. The client server network of claim 2, wherein the catalog has a plurality of addresses and each of the plurality of addresses is capable of holding the association, the confirmer and a linked pointer list connected to one of the plurality of addresses.

4. The client server network of claim 2, wherein the server includes a store coupled to the catalog and the controller and containing a plurality of information connected to the address and the confirmer.

5. The client server network of claim 4, wherein the store is divided into a plurality of blocks and each of the plurality of blocks is uniquely correlated to one of a plurality of associations.

6. The client server network of claim 1, wherein the client transform generator converts a key for a data block to an address and a confirmer.

7. The client server network of claim 6, wherein the key has an indeterminate length.

8. The client server network of claim 6, wherein a length of the address and the confirmer have a determinate length.

9. The client server network of claim 6, wherein the client transform generator further converts the key to a key length.

10. The client server network of claim 1, wherein the communications network is a local area network.

11. The client server network of claim 1, wherein the communications network is a wide area network.

12. The client server network of claim 1, wherein the server transform generator is capable of manipulating a plurality of addresses and confirmers.

13. A method of operating a client server network, comprising the steps of:
   (a) converting a key of a block of data to an address and a confirmer;
   (b) transmitting a query, the address and the confirmer;
   (c) determining if the confirmer is equal to an address confirmer; and
   (d) when the confirmer is equal to the address confirmer, determining a match has occurred.

14. The method of claim 13, further including the steps of:
   (e) when the confirmer is not equal to the address confirmer, searching a first link pointer address;
   (f) determining if the confirmer is equal to a first link pointer address confirmer;
   (g) when the confirmer is equal to the first link address confirmer, determining a match has occurred.

15. The method of claim 13, further including the steps of:
   (e) when the confirmer is not equal to the address confirmer, determining if a first link pointer address exists;
   (f) when the first link pointer address does not exists, responding with a not found message.

16. The method of claim 13, further including the step of:
   (e) responding with a second address and a second confirmer.

17. The method of claim 13, wherein the step (a) includes the step of converting the key to a key length.

18. The method of claim 17, further including the step of:
   (e) determining a second address and a second confirmer based on the address, the confirmer, the key length and an associated key;
   (f) responding with the second address and the second confirmer.

19. The method of claim 18, wherein step (f) includes the step of:
   (f1) manipulating a first address and a first confirmer and the address and confirmer, to form the second address and the second confirmer.

20. A computer readable storage medium containing computer readable instructions that when inserted into a computer connected to a client server network performs the following steps of:
   (a) converting a key of a block of data to an address and a confirmer;
   (b) transmitting a query, the address and the confirmer;
   (c) determining if the confirmer is equal to an address confirmer; and
   (d) when the confirmer is equal to the address confirmer, determining a match has occurred.

21. The computer readable storage medium of claim 20, further including the steps of:
   (e) when the confirmer is not equal to the address confirmer, searching a first link pointer address;
   (f) determining if the confirmer is equal to a first link pointer address confirmer;
   (g) when the confirmer is equal to the first link address confirmer, determining a match has occurred.

22. The computer readable storage medium of claim 20, further including the steps of:
   (e) when the confirmer is not equal to the address confirmer, determining if a first link pointer address exists;
   (f) when the first link pointer address does not exists, responding with a not found message.

* * * * *